United States Patent [19]
Wojcikowski

[11] 3,942,556
[45] Mar. 9, 1976

[54] FLUIDIC SENSOR
[75] Inventor: Richard J. Wojcikowski, Toledo, Ohio
[73] Assignee: Dana Corporation, Toledo, Ohio
[22] Filed: Sept. 30, 1974
[21] Appl. No.: 510,813

[52] U.S. Cl. ................................ 137/804; 73/37.5
[51] Int. Cl.² .......................................... G01B 13/12
[58] Field of Search ......... 137/82, 804; 73/37, 37.5, 73/37.6, 37.7; 239/423, 424, 425, 425.5, 424.5

[56] References Cited
UNITED STATES PATENTS

| | | | |
|---|---|---|---|
| 3,318,320 | 5/1967 | Lloyd | 137/82 |
| 3,460,375 | 8/1969 | Auger | 73/37 |
| 3,482,433 | 12/1969 | Gladwyn | 73/37.5 |
| 3,545,256 | 12/1970 | Beeken | 73/37.5 |
| 3,597,961 | 8/1971 | Pinkstaff | 73/37.5 |
| 3,615,053 | 6/1970 | Pease et al. | 239/424.5 |
| 3,805,869 | 4/1974 | Winter et al. | 239/425 |

Primary Examiner—William R. Cline
Attorney, Agent, or Firm—Robert E. Pollock

[57] ABSTRACT

Disclosed is a fluidic sensor of the proximity type with improved sensing range and response. The sensor generally comprises an inner and outer tubes with an annular passageway therebetween. Air or the like under a low pressure (e.g. 4 pounds per square inch) is introduced in the annular passageway. Presence of an article near the discharge end of the device causes the air to be diverted down the interior of the inner tube and such a "signal" can be used to initiate or terminate control actions. The inner tube in the present invention has a novel exterior configuration which provides increased sensitivity which allows higher recovery (signal/supply) ratios and/or sensing at greater distances than possible with the prior art.

8 Claims, 5 Drawing Figures

3,942,556

FLUIDIC SENSOR

BACKGROUND OF THE INVENTION

This invention relates to fluidic proximity sensors.

A variety of fluidic proximity sensors are known in the prior art. In general, such sensors comprise a tube within a tube, the tubes being so sized as to provide an annular passageway therebetween. In operation, air is introduced into the annular passageway and exists at the end of the device. The presence of an object near the exit end causes some portion of the air to be directed into the bore of the inner tube, serving as a signal to indicate the presence of the object.

For many applications, the design and operating characteristics of the sensor are not critical. Increasingly, however, attention has been directed to improving the operation. Principal efforts in this regard are directed to improved recovery ratios and the ability to sense at increased distances.

The recovery ratio of such a sensor is defined as the ratio of the supply pressure to the signal pressure with a given object at a given spacing from the sensor. Obviously improving the ratio provides the opportunity to reduce air pressure and usage and/or to increase the sensing signal level.

The distance at which the sensor can reliably detect an object is of obvious importance is related, in most cases, to the recovery ratio. In addition some applications require a device with a signal pressure versus distance from sensed object characteristic curve which exhibits a sharp on-off change at a particular distance.

A further desirable characteristic of a fluidic sensor is the ability to sense small or irregularly shaped objects at reasonable distances. The known prior art devices are not generally satisfactory in this regard.

While some improvement in these areas has been achieved still more sensitive devices are desired for some applications. Also, at least some of the more sensitive devices now available are very complex and expensive, limiting their appeal.

It is, therefore, an object of the present invention to provide a proximity sensor with an extremely high recovery ratio.

It is a further object of the invention to provide such a device with a sharp on-off response characteristic.

It is another object of the invention to provide a sensor which can reliably detect small or irregular objects.

It is still a further object of the invention to provide such a device which is relatively simple in design and therefore easy to produce.

SUMMARY OF THE INVENTION

The above and other objects are achieved by the provision of a proximity sensor comprising an inner and outer tubes with an annular space therebetween. The inner tube includes a step reduction in diameter proximate its end and a truncated conical wall portion connecting the step and the discharge end and tapering inwardly in the direction of the end. The end includes a flat surface with a bore therethrough for carrying the sensing signal.

In the preferred configuration the inner tube further includes a second truncated conical surface sloping inwardly away from the step in the direction away from the discharge end.

BRIEF DESCRIPTION OF THE DRAWINGS

Although the specification concludes with claims which particularly point out and distinctly claim what is regarded as the present invention, it is believed that the same will be better understood with reference to the following description of the preferred embodiments taken in conjunction with the accompanying drawings in which:

DESCRIPTION OF THE PREFERRED EMBODIMENTS

Figure 1:
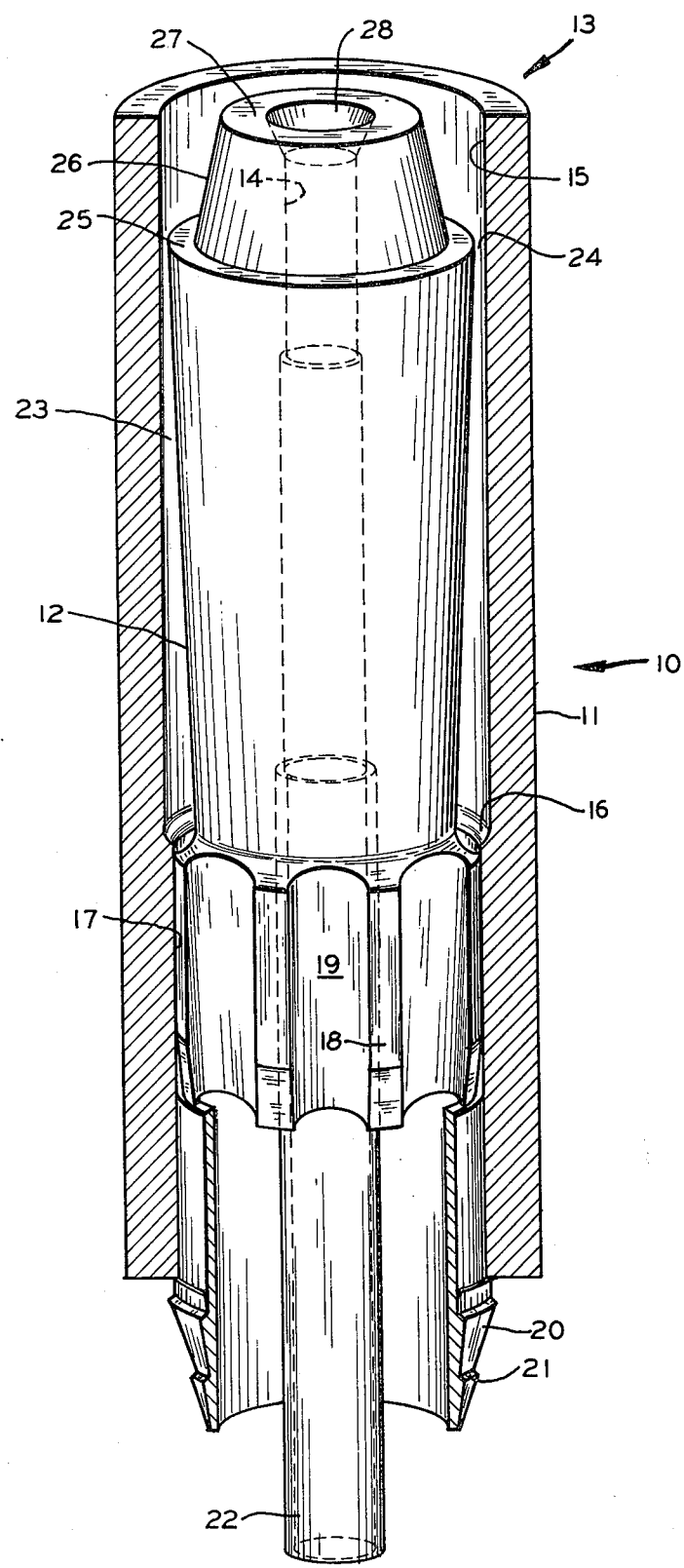
FIG. 1 is an isometric view of a preferred embodiment of the present invention partly broken away for clarity.

Turning now to the drawings, FIG. 1 illustrates a preferred embodiment of the invention, designated generally by the numeral 10, partially broken away for clarity.

Broadly, the sensor 10 comprises an outer tube 11 and an inner tube 12 within and generally concentric with the outer tube. A generally annular passageway is provided between said tubes. Provision is made to admit a suitable fluid into the annular passageway. Normally the fluid is air and it will be so described hereinafter. It should be recognized, however, that in some applications other gases or even liquids can be used. For instance, if the sensor is operating in a reducing atmosphere nitrogen or other non-oxidizing fluids can be used. For applications using fluids other than air it will be recognized that the preferred dimensions and dimensional relationships hereinafter described may be modified somewhat because of the different viscosities, densities and other properties of the various fluids.

Air admitted into the annular passageway flows axially therethrough to the exit or sensing end of the device which is generally indicated by the numeral 13. If an object to be sensed is sufficiently close to the end 13 air is directed into the passageway 14 in the inner tube 12 to provide a sensing signal.

The inner tube 12 has a novel configuration which provides sensing capabilities substantially better than those of prior art devices as will hereinafter be described.

The outer tube includes a generally cylindrical axial bore 15 which, in the preferred embodiment, is stepped at 16 to provide a relatively large bore proximate the end 13 and a somewhat smaller bore 17 at the distal end thereof. The inner tube is supported within the bore of the tube 11 and more particularly in the distal end 17 thereof as a result of the snug fit of the base 18 of the inner tube in the bore 17. The base 18 includes a plurality of spaced axial grooves 19 or other suitable means to provide an axial passageway for air.

A connection for supply air is provided by means of tubing connector 20 which is inserted in the bore 17 and affixed thereto by any suitable means such as an adhesive or by virtue of a press fit. A portion of the connector 20 extends externally of the tube 10 and includes hose engaging annular ridges 21.

The axial bore 14 extends the length of the tube 12 and has press fit therein or otherwise secured thereto a tube 22 to provide a connection for tubing or the like to carry the sensing signal.

Commencing at the step 16 the inner tube extends axially toward the end 13 for a length sufficient to achieve relatively even distribution of the air throughout the annular space 23 between the inner and outer tubes. Preferably the wall of the tube 12 in this region is slightly conical in nature, increasing in diameter in the direction approaching the end 13. Such a construction allows relatively high air velocities in the region indicated by the numeral 24 adjacent the widest portion of the tube without an unduly high pressure drop in the system to that point.

The exit end of the inner tube includes two radial "steps" which serve to focus the air stream. The first step 25 is normally at the widest point in the inner tube. Preferably it is planar and normal to the axis of the sensor. Although less preferred, the step 25 can be slightly frustroconical in nature and sloped so as to be either convex or concave as viewed from the end 13.

Commencing at the step 25 is a frustroconical section 26 which progressively decreases in diameter as it approaches the end 13. The end of the tube 12 includes an annular plateau 27 which is generally normal to the axis of the device. The abrupt transition from the frustroconical wall 26 to the plateau also serves to focus the air stream. The plateau 27 for best operation is substantially axially aligned with the corresponding end of the outer tube 11.

The bore 14 preferably includes a frustroconical entrance section 28 which increases in diameter in the direction approaching the end 13 and serves as a "funnel" for the sensing air signal.

Figure 2:
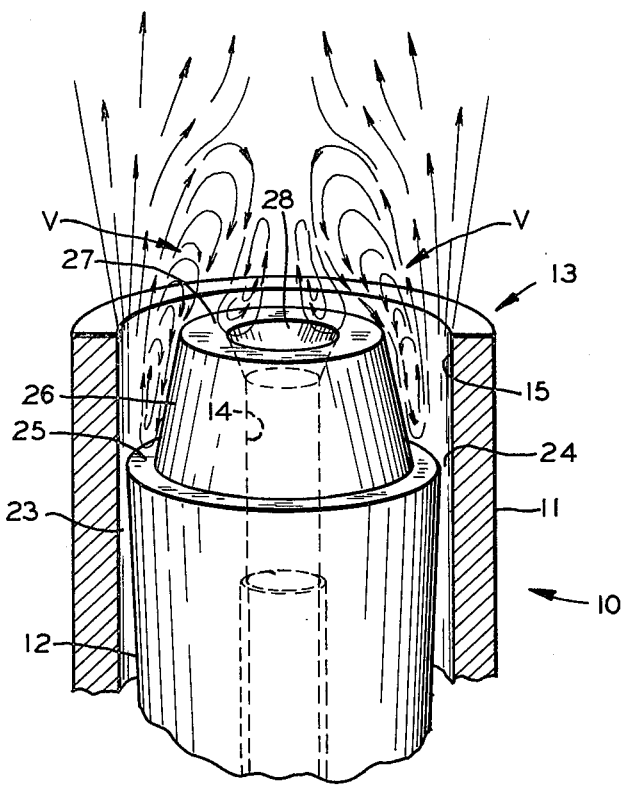
FIG. 2 is a vertical cross-sectional view generally corresponding to FIG. 1 and showing the air flow patterns associated with the device.

While applicant does not wish to be bound by theory, it appears that the effect of the step 25, frustroconical wall 26 and plateau 27 is to produce a toroidal vortex which serves to focus the air stream. This effect is illustrated in FIG. 2 wherein a single vortex, designated by the letter "V" is shown. Depending on the exact geometry of the device and the velocity of the air stream, it is also believed possible for two separate but co-acting toroidal vortexes to be formed, one above the step 25 and one above the plateau 27.

Figure 3:
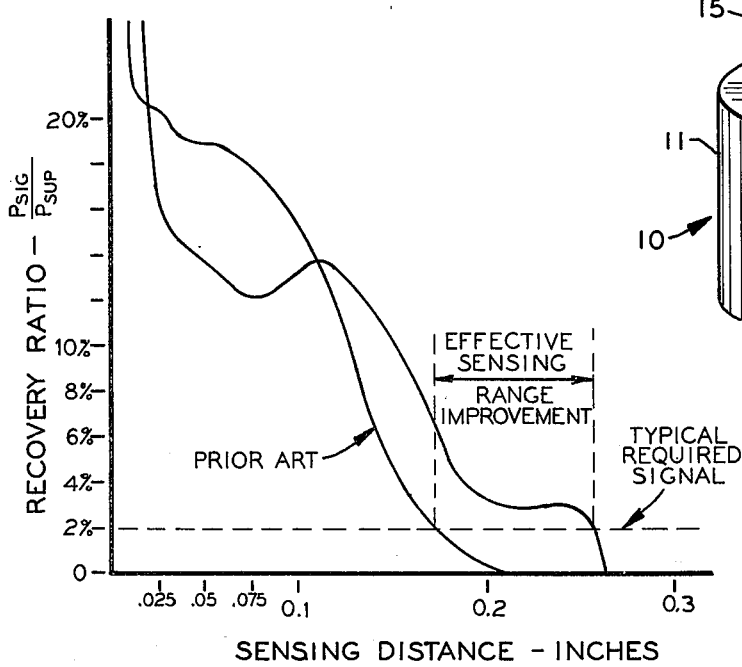
FIG. 3 is a graph illustrating the sensitivity of the device of FIGS. 1 and 2.

FIG. 3 is a graph comparing the performance of the present invention with one of the better prior art devices. The graph was developed by bringing a large flat target oriented normal to the axis of the sensors progressively closer to the sensing ends thereof and recording distance and signal strength.

The prior art sensor was supplied with air at its rated supply pressure; i.e., at 10 P.S.I. The device of the instant invention was supplied with air at the design supply pressure therefor which is 4 P.S.I. To normalize the data the signal pressure is expressed as a percent of the supply pressure as is commonly done in comparing such devices.

Two advantages of the instant invention over the prior art are immediately apparent with reference to the graph. First, the effective range of the device exceeds that of the prior art. As or more important for some applications, the present device exhibits a sharp on-off characteristic at the limit of its range. This attribute obviously allows the present invention to be used in some applications wherein the prior art is unsatisfactory.

The sensor 10 is relatively sensitive to certain geometric relationships. It has been found that the geometry and size of the "funnel" 28 relative to the remainder of the tip of the sensor is an important variable in the present sensor. Specifically, it has been found that in a structure with no "funnel" (i.e., in which the bore 14 extends in uniform size to the plateau 27) there is a marked tendency for the device to have a substantial signal pressure with no object to be sensed. For the geometry of the preferred embodiment as detailed hereinafter, if the "funnel" is eliminated a pressure of as much as six inches of water may be seen in the sensing line in the absence of an object to be sensed. The addition of a funnel decreases such pressure and, to a point, the decrease is progressive with increasing funnel opening size. Beyond such point the signal pressure in the absence of an object to be sensed again increases. In the preferred embodiment the area of the large end of the "funnel" is approximately 33% of the area of the annular plateau 27.

The included angle between the sides of the funnel also affects the device. Angles between 30° and 90° are preferred and about 60° is particularly preferred.

Figure 4:
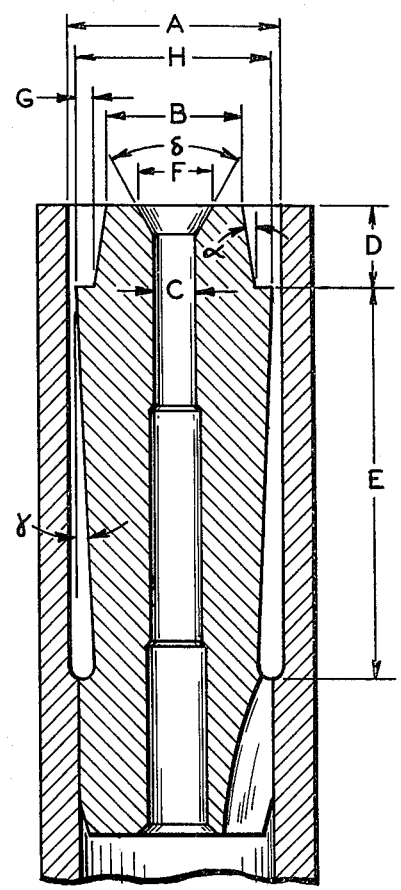
FIG. 4 is a vertical cross-sectional view of the present invention showing the dimensions thereof.

The aforementioned and other dimensions of preferred devices are given in the following table which refers to those dimensions shown on FIG. 4. Where a range of dimensions which is important to the performance of the device has been established, the limits of the preferred range are also given:

| DIMENSION | PREFERRED EMBODIMENT | PREFERRED RANGE | PARTICULARLY PREFERRED |
|---|---|---|---|
| | Inches (mm) | | |
| A | 0.2715 (6.9) | | |
| B | 0.156 (4) | | |
| C | 0.072 (1.8) | | |
| D | 0.125 (3.2) | | |
| E | .625 (15.9) | | |
| F | 0.078 (2.0) | | |
| G | 0.022 (.56) | | |
| H | 0.250 (6.35) | | |
| α | 9.5° | 0–15° | 7–12° |
| γ | 7° | 0–15° | |
| δ | 60° | 45–70° | 50–70° |
| Area Ratio $\frac{F^2}{B^2-F^2}$ | 33% | 25%–60% | 30%–40% |

Where a sensor of the present invention is to be designed to be larger or smaller the normal considerations of geometric similitude are preferably applied.

The sensor of the present invention is particularly well adapted to sense small and/or irregularly shaped objects as well as flat objects which are oreinted other than normal to the axis thereof. It appears that this desirable result is achieved because sensing with the present device is accomplished by disturbing a delicately balanced flow pattern. Known prior art devices, by contrast, generally reflect an air stream off the the object to be sensed and back into the sensing line. For example, the performance of the present device sensing, e.g., a ¼ inch (6.4mm) diameter sphere is substantially the same as that shown in FIG. 3 while the performance of the prior art device under these conditions will be substantially poorer than that illustrated.

It should also be noted that the extreme sensitivity of the device provides certain additional opportunities and problems. In particular, the device has a tendency to be bistable; i.e., to hold a signal once achieved even when the object causing the signal is removed. This characteristic can be useful in that it provides a memory function.

In the majority of applications, however, the bistable characteristic is not required and may even be undesirable. When a device of the present invention and of a particular geometry has a tendency to be bistable at least two means are available to remedy the situation by destabilizing the system. The destabilization occurs by making the device assymmetrical in the air flow region. One way of achieving this end is by shifting the axis of the inner tube slightly with respect to the axis of the outer tube. The shifting can be either angular or parallel.

Figure 5:
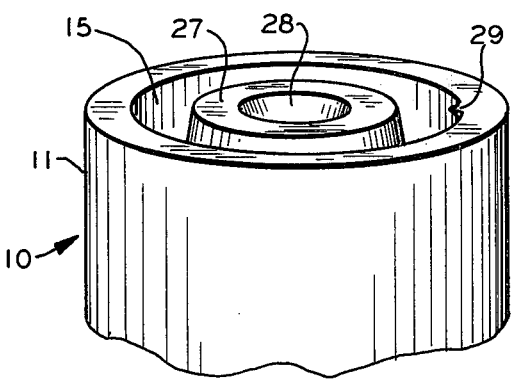
FIG. 5 is an isometric view of a modification of the present invention.

Alternatively and generally simpler, a protuberance can be provided in the air flow path. As seen in FIG. 5, such an assymmetry can be produced by deforming the end of the outer tube 11 in at least one place to form a pointed protuberance 29 extending about 0.020–0.025 inch (0.5–0.6mm) into the air flow path. The preferred location for such a protuberance, where required, is individually established for each device in the following manner. The device is connected to a source of supply air and the "signal" (in the absence of an object) is measured. A suitable protuberence such as a knife edge is introduced in the air stream to simulate the protuberence 29. The device is rotated relative to the knife edge and the relative position therebetween which results in the lowest sensing pressure (with no target in place) is established. Such location is the preferred location for the protuberence.

Many modifications will occur to those skilled in the art with reference to the foregoing disclosure of the preferred embodiment which is not intended to be limiting.

What is claimed is:

1. A fluidic sensor comprising an outer tube defining a generally cylindrical bore therethrough and an inner tube defining a bore therethrough said tubes being generally coaxial and spaced to form an annular air supply passageway therebetween, said inner tube including an annular end portion generally normal to the axis of said tube and axially aligned with an end of said outer tube, an annular step axially spaced from said end portion and generally parallel thereto and a frustroconical wall extending from said end portion to said step and increasing in diameter in the direction of said step and means for connection of air supply for communication with said annular space and for connection of an air signal line in communication with said bore in said inner tube.

2. The sensor of claim 1 wherein said bore includes a frustroconical outlet which increases in diameter as it approaches said end.

3. The sensor of claim 1 wherein said inner tube includes a frustroconical exterior wall extending from said step and progressively decreasing in diameter as it extends away from said end.

4. The sensor of claim 3 wherein said bore includes a frustroconical outlet which increases in diameter as it approaches said end.

5. The sensor of claim 1 which further includes an assymmetry to prevent bistable operation.

6. The sensor of claim 5 wherein said assymmetry comprises a protuberence extending inwardly from said outlet tube.

7. The sensor of claim 5 wherein said bore includes a frustroconical outlet which increases in diameter as it approaches said end.

8. The sensor of claim 5 wherein said inner tube includes a frustroconical exterior wall extending from said step and progressively decreasing in diameter as it extends away from said end.

* * * * *

UNITED STATES PATENT OFFICE
CERTIFICATE OF CORRECTION

PATENT NO. : 3,942,556
DATED : March 9, 1976
INVENTOR(S) : Richard J. Wojcikowski It is certified that error appears in the above-identified patent and that said Letters Patent are hereby corrected as shown below:

Claim 4, line 1 after "bore" insert -- in said inner tube --.

Claim 7, line 1 after "bore" insert -- in said inner tube --.

Signed and Sealed this

Twenty-first Day of September 1976

[SEAL]

Attest:

RUTH C. MASON
*Attesting Officer*

C. MARSHALL DANN
*Commissioner of Patents and Trademarks*